US007330822B1

(12) United States Patent
Robson et al.

(10) Patent No.: US 7,330,822 B1
(45) Date of Patent: Feb. 12, 2008

(54) METHODS AND SYSTEMS FOR MANAGING HIERARCHICALLY ORGANIZED AND INTERDEPENDENT TASKS AND ISSUES

(75) Inventors: Kurt G. Robson, Foster City, CA (US); Girish R. Divate, Union City, CA (US); Cedric M. Ng, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 941 days.

(21) Appl. No.: 09/867,333

(22) Filed: May 29, 2001

(51) Int. Cl.
*G06F 9/46* (2006.01)
(52) U.S. Cl. ........................................................ 705/9
(58) Field of Classification Search ................ 705/9
See application file for complete search history.

(56) References Cited

U.S. PATENT DOCUMENTS

| 5,563,994 | A | * | 10/1996 | Harmon et al. ............. 345/440 |
| 5,858,394 | A | * | 1/1999 | Lipp et al. .................. 424/449 |
| 6,101,481 | A | * | 8/2000 | Miller .......................... 705/9 |
| 6,167,568 | A | * | 12/2000 | Gandel et al. .............. 717/176 |
| 6,222,535 | B1 | * | 4/2001 | Hurd, II ...................... 715/733 |
| 6,370,575 | B1 | * | 4/2002 | Dougherty et al. ......... 709/224 |
| 6,523,027 | B1 | * | 2/2003 | Underwood ................... 707/4 |
| 6,578,006 | B1 | * | 6/2003 | Saito et al. .................. 705/9 |
| 6,675,127 | B2 | * | 1/2004 | LaBlanc et al. ............ 702/181 |
| 6,678,698 | B2 | * | 1/2004 | Fredell et al. ........... 707/104.1 |
| 7,031,930 | B2 | * | 4/2006 | Freeman et al. ............... 705/9 |
| 7,058,588 | B2 | * | 6/2006 | Young et al. .................. 705/8 |

| 2002/0082895 | A1 | * | 6/2002 | Budka et al. .................. 705/9 |
| 2004/0205657 | A1 | * | 10/2004 | Kudo et al. ................ 715/530 |

FOREIGN PATENT DOCUMENTS

| JP | 2001016095 | * | 1/2001 |
| WO | WO 01/33477 A2 | * | 5/2001 |

OTHER PUBLICATIONS

Pyron, Tim, Special Edition Using Microsoft Project 2000 Que, Sep. 2000, ISBN: 0-7897-2253-4.*
Microsoft Project 2000—Feature Guide Microsoft.*
Microsoft Project 2000 Extends Project Management to Entire Teams Microsoft Press Release, Nov. 1999.*

(Continued)

*Primary Examiner*—B. Van Doren
*Assistant Examiner*—Scott L. Jarrett
(74) *Attorney, Agent, or Firm*—Young Law Firm, P.C.

(57) ABSTRACT

A method of managing a project including a hierarchy of tasks may include defining and storing tasks. Each of the tasks may include an associated status. A first dependency relationship may be defined between the tasks. Remote retrieval and updating of the status may be enabled. An Issue, a Change Request and/or a Change Order may be remotely defined. The Issue identifies a problem within an identified task whose resolution is to be tracked and is necessary for completion of the identified task, the Change Request identifies step(s) to be taken pending authorization to resolve the Issue and the Change Order identifies authorized step(s) to do so. Remote definition of second dependency relationship(s) may be enabled between the defined Issue, Change Request or Change Order and the identified task to integrate the defined Issue, Change Request or Change Order into the hierarchy without changing the defined first dependencies.

61 Claims, 6 Drawing Sheets

OTHER PUBLICATIONS

Bugzilla.org—Roadmap and releases web pages, Retrieved from www.bugzilla.org, May 3, 2005.*
Barnson, Mathew, The Bugzilla Guide, Dec. 2000-Apr. 2001, Retreived from www.linuxvalley.it/encyclopedia/ldp/guide/bgz.*
Mozill.org-Bugs web pages Oct. 1999, Retrieved from Archive.org, May 3, 2005.*
Primavera Project Planner—Planning and Control Guide Version 3.0 Primavera Systems, 1999.*
Feibus, Andy, Team 98 offers customized view of tasks, progress Information Week, Apr. 5, 1999, pp. 82-82, 86.*
Barnes, Michael, Customization of ERP apps requires development skills Information Week, Feb. 22, 1999, pp. 9A-10A, 12A, 14A.*
UniPress Software Launches New Relase of Award Winning FootPrints Solution PR Newswire, Jun. 26, 2000.*
McDowell, Just-in-time project management IIE Solutions, Apr. 2001, vol. 33, No. 4, pp. 30-33.*
Lientz, Bennet et al., Breakthrough Technology Project Management Second Edition Academic Press, Dec. 11, 2000, ISBN: 0-12-449968-6.*
UniPress.com Web Pages Jan. 2000-Jun. 2001, Retrieved from Archive.org, Oct. 20, 2005.*
Merant.com—PVCS Web Pages Jan. 2000, Retreived from Archive.org, Oct. 20, 2005.*
PVCS Tracker Web Interface—Technical Brief Merant, Aug. 2000, Retrieved from Archive.org, Oct. 20, 2005.*
PVCS Tracker Overview Merant, Aug. 2000, Retrieved from Archive.org Oct. 20, 2005.*
PVCS Links Issue Management With Development Environment via TrackerLink PR Newswire, Oct. 15, 1998.*
Merant PVCS Tracking—Issue and Change Management Control Reviewer's Guide Merant, Aug. 2000, Retrieved from Archive.org Oct. 20, 2005.*
Choosing an Issue and Change Mangement Tool White Paper Merant, 1999, Retreived from Archive.org, Oct. 20, 2005.*
Dutoit, Allen et al., Using an issue-based model in a team-based software engineering course IEEE 1996, pp. 130-137.*
Continuus Software Releases ChangeSynergy 3.5 to Simplify, Customize and Automate Change Request Management Lifecycles, Business Wire, Sep. 18, 2000.*
FootPrints Provides Organizations with Powerful Integrated Email Capabilities to Speed Issue Tracking and Problem Resolution While Streamlining Project Management, PR Newswire, Apr. 10, 2001.*
Yee, Ka-Ping, Roundup: An Issue- Tracking System for Knowledge Workers 2000.*
Merant.com—PVCS Product Pages Feb. 2001, Retrieved from Archive.org, Jun. 12, 2006.*
Continuus.com Web Pages, Oct.-Nov. 2000, Retreived from Archive.org Jun. 12, 2006.*
McCally, Bob, Change-Order Management AACE International Transactions, 1997.*
Kumar, Ashish, Managing Changes in Large Programs AACE International Transactions, 2000.*
Douglas, Edward, Project Trends and Change Control AACE International Transactions, 2000.*
Duncan, William, A Guide To The Project Management Body of Knowledge Project Mangement Institute, 1996, ISBN: 1-880410-12-5.*
Barnes, Michael, Customization of ERP apps require development skills Information Week, Feb. 22, 1999, pp. 9A-10A, 12A, 14A.*
MERANT Introduces News PVCS Professional 3.5 for E-Business PR Newswire, Nov. 1, 1999.*
Grygo, Eugene et al., Upgrades deal with change InfoWorld, vol. 22, No. 14, Apr. 3, 2000.*
Gilbert, Alorie, Merant Promises to Ease Complicated ERP Upgrades InformationWeek, Apr. 10, 2000.*
Smith, Kenny, Exploring Oracle: Managing Change with Designer and Change Manager, Part 1 Exploring Oracle, vol. 5, No. 5, May 2000.*
Smith, Kenny, Exploring Oracle: Managing Change with Designer and Change Manager, Part 2 Exploring Oracle, vol. 5, No. 6, Jun. 2000.*
Oracle, "Oracle Projects User's Guide", Release 11, vol. 1, Mar. 1998.

* cited by examiner

METHODS AND SYSTEMS FOR MANAGING HIERARCHICALLY ORGANIZED AND INTERDEPENDENT TASKS AND ISSUES

BACKGROUND OF THE INVENTION

1. Field of the Invention

The present invention relates generally to the management of complex projects. More particularly, the present invention relates to the field of project schedule management for large and complex projects and to methods and systems designed to enable a collaborative and distributed maintenance of project schedules.

2. Description of the Related Art

The development of a new product, whether tangible or intangible (such as a new service) is often mapped out in a project, which sets out an anticipated timeline for taking the product or service from concept through final implementation, distribution or production. Such projects may be phenomenally complex at their inception or may become so during the lifetime thereof, particularly in the high technology, aerospace, defense and financial services industries, to identify but a few examples. Software tools exist that help project managers define the project and an anticipated project timeline. However, such tools typically give the manager only a macro-level view of the project and of the constituent tasks thereof. More often than not, however, projects do not docilely follow their anticipate timeline, as set out at the beginning of the project. Indeed, unanticipated problems arise in all but the simplest projects. As such problems arise and are addressed, the originally defined project timeline and the actual progress of the project over time diverge and may ultimately bear little useful relation to one another. Moreover, as the complexity of the project rises, the burden of updating the project schedule may become a significant drain on resources, further eroding its perceived usefulness in the eyes of those tasked with managing the project. When this happens, critical updates may not be incorporated into the project schedule, which further decreases its utility as a predictor of project completion and as a project status indicator.

Large and complex projects may involve hundreds or thousands of people, and are often widely distributed, not only across geographical and political boundaries, but also across enterprise boundaries and time zones. More often than not, the contributors to a project do not have (and need not have) the same level of access to the project details and schedule. Compartmentalization is commonly used to segregate project contributors for a variety of reasons, such as to insure security. The consequence of such compartmentalization, however, is that project contributors do not have the access required to determine the relative importance of the task assigned to them within the project. As most tasks within a project are connected to many others, a failure or delay in even a seemingly low-level task may have profound repercussions in higher level tasks as the effect of that failure or delay ripples up the project hierarchy.

What are needed, therefore, are improved project scheduling tools that enable project contributors to dynamically update the project definition and timeline. What is also needed are methods and systems to enable potentially widely disseminated project contributors to update the status of their assigned task in a secure manner and in a manner that insures that the overall project timeline accurately describes the current status of the entire project and its constituent tasks and functions as an accurate predictor of the project completion. Also needed is a scheduling tool for large and complex projects that is sufficiently flexible as to enable project contributors to define new tasks and problem Issues and that enables the tracking of the progress of such new task and Issues, from definition through resolution thereof.

SUMMARY OF THE INVENTION

It is, therefore, an object of the present invention to provide improved project scheduling tools that enable project contributors to dynamically update the project definition and timeline. It is another object of the present invention to provide methods and systems to enable potentially widely disseminated project contributors to update the status of their assigned task in a secure manner and in a manner that insures that the overall project timeline accurately describes the current status of the entire project and its constituent tasks and functions as an accurate predictor of the project completion. A still further object of the present invention is to provide a scheduling tool for large and complex projects that is sufficiently flexible as to enable project contributors to define new tasks and problem Issues and that enables tracking the progress of such new task and Issues, from definition through resolution thereof.

In accordance with the above-described objects and those that will be mentioned and will become apparent below, a method of managing a project that includes a plurality of interdependent tasks according to the present invention, may include steps of defining a first and a second task and storing the first and second tasks in a database stored in a server that is selectively and remotely accessible over a computer network, each of the first and second tasks having a status associated therewith; defining a first dependency relationship between the first and the second tasks and storing the defined first dependency in the database; enabling remote updating of the status of the first and/or second tasks over the computer network; enabling remote definition of an Issue, a Change Request and/or a Change Order, the Issue identifying a problem within the project whose resolution is to be tracked, the Change Request identifying one or more steps to be taken pending authorization to resolve Issue and the Change Order identifying authorized steps to resolve the Issue; storing the defined Issue, Change Request and/or Change Order in the database and enabling remote definition of one or more second dependency relationships between the defined Issue, Change Request and/or Change Order and the first and/or second tasks and storing the defined second dependency in the database.

According to further embodiments, a step of defining a permission that defines access rights for the first task, the second task, the Issue, the Change Request and/or the Change Order may be carried out. The permission further may define a right to remotely change the status of the first task and/or the second task and/or to remotely change the first dependency relationship between the first and second task. The first and/or second dependency relationships may be selected from a group including Start-Start, Start-Finish, Finish-Start and Finish-Finish, for example. The first and/or second dependency relationships may include a definition of a lag time between the start and/or finish of at least two of the defined first and second tasks, the Issue, the Change Request and the Change Order. The problem identified by the Issue may be a problem that was previously unidentified at the time when the first and second tasks were defined. Each of the defined Issue, Change Order and Change Request may include a status associated therewith and the method may further include a step of enabling remote updating of the status of the defined Issue, Change Request and/or Change Order. The status of the first task, the second task, the defined Issue, Change Order and Change Request may be selected from a group including: not started, on track, complete, in trouble, on hold and cancelled, for example. The permission may further define a right to remotely change the stored second dependency relationship (s). A step may be carried out to maintain a selectively and remotely accessible graphical representation of the first task, the second task, the first dependency relationship, the defined Issue, Change Request and/or the Change Order and/or the second dependency relationship, among other items. The selectively and remotely accessible graphical representation may be rendered on a Web browser or other suitable interface. A step may be carried out to define and store in the database an identity of at least one entity allowed access to and/or having responsibility for each of the defined first and second tasks, the defined Issue, Change Request and/or the Change Order. The entity, for example, may be selected from a group including a project team, a project member, a subcontractor and a vendor. The computer network may include the Internet, for example, or may be a private computer network. The computer network's reach may cross time zone, geographical and/or enterprise (corporate) boundaries. The graphical representation may include, for example, a selectively expandable hierarchical tree (with an unlimited number of levels) that shows the first task, the second task, the first dependency relationship, the defined Issue, Change Request and the Change Order and/or the second dependency relationship. A step may be carried out to prompt the user for the remote definition of an Issue, Change Request, Change Order and/or the second dependency relationship(s) when (for example) the status of a task is updated. Steps may be carried out to enable a document to be associated with the defined first and second tasks, the Issue, the Change Request and/or the Change Order and to enable the associated document to be stored in the database.

According to another embodiment thereof, the present invention is also a method of participating in a project that includes a plurality of interdependent tasks, comprising the steps of accessing a remote database over a computer network, the database storing: a definition of a first and a second task, a status associated with each of the first and second tasks, and a first dependency relationship between the first and the second task; updating of the status of at least one of the first and second tasks over the computer network; defining and causing to be stored in the database at least one of an Issue, a Change Request and a Change Order, the Issue identifying a problem within the project whose resolution is to be tracked, the Change Request identifying at least one step to be taken pending authorization to resolve Issue and the Change Order identifying authorized steps to resolve the Issue; defining one or more second dependency relationships between the defined Issue, Change Request or Change Order and the first and/or second tasks and causing the defined second dependency to be stored in the database.

The present invention may also be viewed as a computer system configured for managing a project timeline that includes a plurality of interdependent tasks, comprising: at least one processor; at least one data storage device; a plurality of processes spawned by the at least one processor, the processes including processing logic for: defining a first and a second task of the plurality of tasks and storing the first and second tasks in a database stored in a server that is selectively and remotely accessible over a computer network, each of the first and second tasks having a status associated therewith; defining a first dependency relationship between the first and the second tasks and storing the defined first dependency in the database; enabling remote updating of the status of the first and/or second tasks over the computer network; enabling remote definition of an Issue, a Change Request and/or a Change Order, the Issue identifying a problem within the project whose resolution is to be tracked, the Change Request identifying at least one step to be taken pending authorization to resolve Issue and the Change Order identifying authorized steps to resolve the Issue; storing the defined Issue, Change Request and/or Change Order in the database; enabling remote definition of one or more second dependency relationships between the defined Issue, Change Request or Change Order and the first and/or second tasks and storing the defined second dependency in the database.

The present invention, according to another embodiment thereof, is a machine-readable medium having data stored thereon representing sequences of instructions which, when executed by computing device, causes the computing device to manage a project timeline that includes a plurality of interdependent tasks by performing the steps of: defining a first and a second task and storing the first and second tasks in a database stored in a server that is selectively and remotely accessible over a computer network, each of the first and second tasks having a status associated therewith; defining a first dependency relationship between the first and the second tasks and storing the defined first dependency in the database; enabling remote updating of the status of the first and/or second tasks over the computer network; enabling remote definition of an Issue, a Change Request and/or a Change Order, the Issue identifying a problem within the project whose resolution is to be tracked, the Change Request identifying at least one step to be taken pending authorization to resolve Issue and the Change Order identifying authorized steps to resolve the Issue; storing the defined one of the Issue, Change Request and Change Order in the database; and enabling remote definition of at least one second dependency relationship between the defined Issue, Change Request or Change Order and the first and/or second tasks and storing the defined second dependency in the database.

DESCRIPTION OF THE INVENTION

Functional Description

Figure 2:
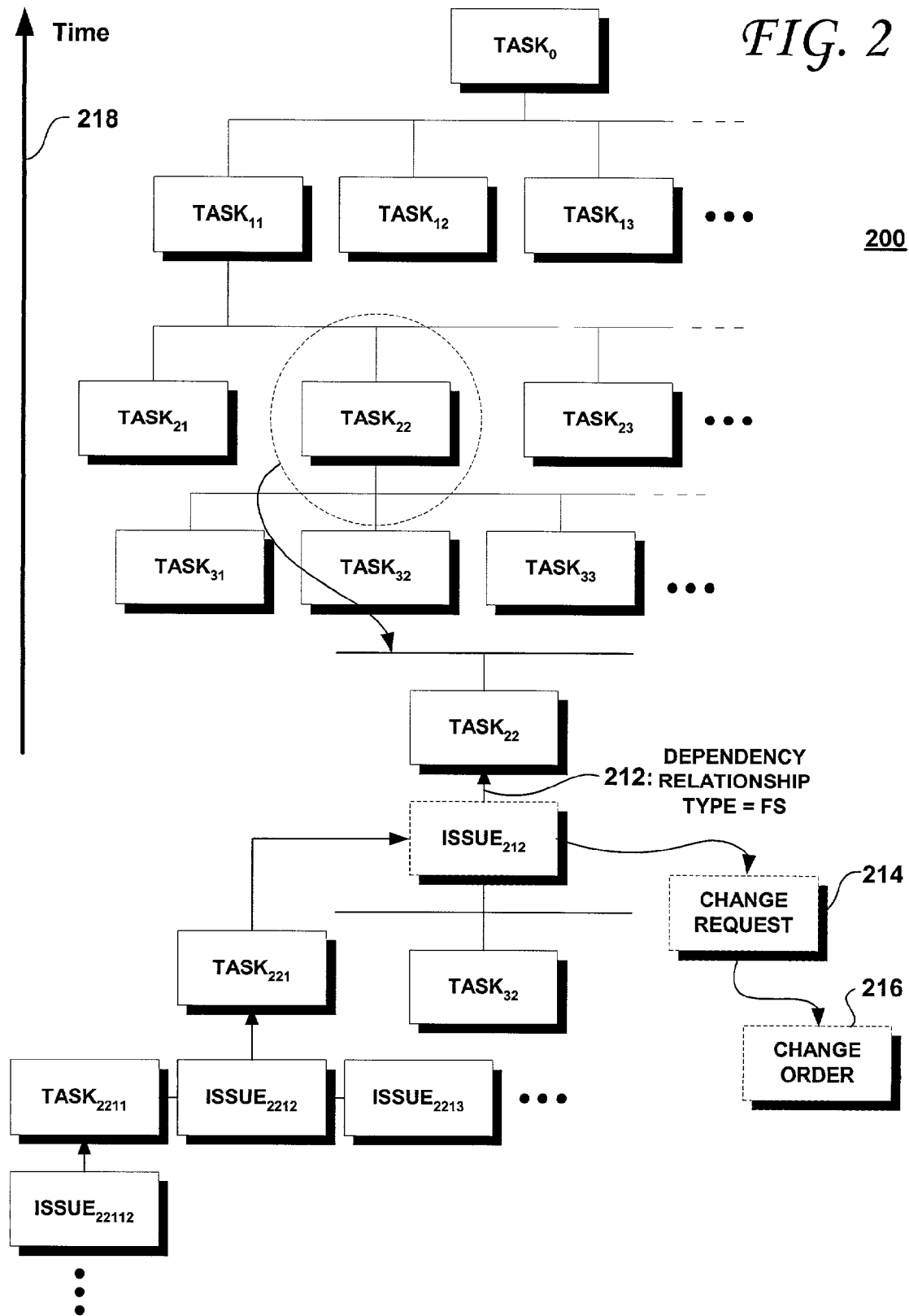
FIG. 2 shows a project task hierarchy, according to an embodiment of the present invention.

FIG. 2 shows a project task hierarchy 200, according to an embodiment of the present invention. The constituent tasks of the project hierarchy 200 may be logically organized and represented as a hierarchical tree structure. The tree structure, as shown in FIG. 2, may include a root task, such as shown at $Task_0$. $Task_0$, for example, may represent the ultimate goal of the project, such as the manufacture of airliner, the coding of a large software product, the design of an automobile or some other large and complex project. As shown, $Task_0$ has a number of predecessor tasks that must be completed before $Task_0$ may be considered to have been completed. The predecessor-successor relationship between the constituent tasks of the project 200 are indicated by the arrow 218 labeled "Time". Thus, $Task_{11}$, $Task_{12}$ and $Task_{13}$ (and possibly others, as suggested by the dashed lines) are predecessor tasks to $Task_0$. In turn, each of the $Task_{11}$, $Task_{12}$ and $Task_{13}$ may have a number of predecessor tasks. For simplicity of illustration, only the predecessor tasks of $Task_1$, are shown in FIG. 2. These include the tasks labeled $Task_{21}$, $Task_{22}$ and $Task_{23}$. Likewise, completion of $Task_{22}$ may be related to predecessor tasks $Task_{31}$, $Task_{32}$ and $Task_{33}$. It is understood that the hierarchical tree structure 200 is but a partial illustration of an example of a large project. In practice, projects may be considerably more complex than suggested by FIG. 2 and the present invention is drawn to managing such complex projects, using the systems and methodologies detailed herein.

According to the present invention, each of the tasks shown in FIG. 2; namely $Task_0$ to $Task_{33}$, is related to at least one other task within the project by a selectable dependency relationship. For example, the dependency relationships may be categorized by the following non-exclusive and exemplary list: Start-Start (SS), Start-Finish (SF), Finish-Start (FS) and Finish-Finish (FF). These dependency relationships may be understood by assigning the first letter of the combinations (SS), (SF), (FS) and (FF) to the "Started or Finished" status of the current task and the second letter the "Started or Finished" status of the successor task. Should the dependency relationship between two tasks be selected to be SF, for example, the current task may not be started until its successor task is finished. Likewise, a dependency relationship of FS indicates that the current task must be finished before its successor task may be started. Similarly, SS, indicates that the current task must be started before work may begin on its successor task (both tasks should, therefore, run concurrently). Lastly, a dependency relationship of FF between tasks means that both the current task must be finished before its successor task is finished. Other dependency relationships may be defined and implemented within the context of the present invention, as those of skill in this art may recognize. Alternatively, the above-detailed dependency relationships (SS, SF, FS and FF) may refer to the current task and the current task's predecessor task. Whichever convention is chosen, however, should preferably be adopted for all of the dependencies throughout the project.

Large projects, by their very nature, may not be fully definable at the project inception. That is, each constituent task of the project may not be defined at the start of the project. Problems can and frequently do arise in complex projects, and these problems, whether on the project critical path or not, may be interrelated to other tasks within the project. Moreover, the impact of delays caused by such unanticipated problems may not be immediately apparent to the person or group encountering the problem or, more egregiously, to the project management. Such problems, unless tracked within the context of the other defined tasks of the project, have the capacity to derail the entire project timeline or key portions thereof. One of the major responsibilities of project managers is to accelerate the priority of selected tasks, as it is often only the project manager (or the managers of specific portions of the project) that is privy to the macro-level view of the project necessary to identify potential problem areas and to take the requisite preemptive measures. If unanticipated problems arise and are not integrated within the larger project management framework, critical dates may slip and the timeliness of completion of the project may be in jeopardy.

The present invention, therefore, provides methods and systems to track and manage such unanticipated problems by integrating them into the project schedule, as set forth below. Referring back to FIG. 2, the present invention provides the ability to define an Issue and to integrate that Issue within the project management framework. Graphically, such an Issue (shown in FIG. 2 as $Issue_{212}$) may be illustrated as being inserted within the hierarchical tree structure 200, thereby enabling the Issue to be assigned appropriate relationship dependencies to the existing tasks (and/or other Issues) within the tree structure 200. In the illustrative example developed in FIG. 2, the present invention provides for the ability to insert $Issue_{212}$ (representing a previously unidentified problem or unresolved Issue) into the hierarchical tree structure 200 between, for example, $Task_{22}$ and the tasks $Task_{31}$, $Task_{32}$ and $Task_{33}$. Moreover, the present invention also provides for defining the dependency relationship of the inserted Issue with its predecessor and successor task(s) and/or other Issue(s) within the hierarchical tree structure 200 or other project management framework. This ability to insert an Issue into the task hierarchy not only enables project managers to manage the newly discovered issue, but also directly involves the person(s) responsible for resolving the Issue more fully in the project by requiring that the dependency relationships between the new Issue and pre-existing tasks and/or other Issues be identified and integrated into the project hierarchy 200.

According to the present invention, resolution of an Issue such as $Issue_{232}$, may involve nothing more than a delay in providing some deliverable item, for example. In that case, when the item is delivered, the Issue may be fully resolved, or the delay may trigger cascading delays in other tasks and/or Issues. However, to resolve an Issue, the execution of specific steps may be required. Such steps may be carried out without further input from the project management. Alternatively, the steps required to resolve the Issue may be such as to require some level of authorization from some level of the project management team. In such a case, the Issue may evolve into (or may be modified to include) a Change Request that outlines one or more proposed steps to resolve the previously identified Issue, as shown at 214 in FIG. 2. Such a Change Request may include a document associated with the identified Issue and listing proposed steps to resolve the Issue. When and if authorization is obtained to implement the changes outlined in the Change Request or to execute the proposed steps listed therein (or modified versions thereof), the Change Request 214 may evolve into (or be replaced by) a Change Order, as shown at 216. A Change Order, according to the present invention, identifies the changes or steps that have been authorized by the relevant authority to resolve the Issue, such as $Issue_{212}$. As shown in FIG. 2, a dependency relationship 212 may be defined between the newly defined $Issue_{212}$, the Change Request 214 and/or the Change Request 216 and its successor and/or predecessor task(s). In the example shown in FIG. 2, reference 212 is identified as being a dependency relationship of the FS type, meaning that $Issue_{212}$ must be completed (i.e., resolved) before $Task_{22}$ may be started. Therefore, resolution of the newly discovered $Issue_{212}$ may be critical to the project, as $Task_{22}$ may not even be started until $Issue_{212}$, Change Request 214 and/or Change Order 216 is resolved/completed. Moreover, resolution of $Issue_{212}$ may itself require the definition and resolution of one or more additional Issues and/or Change Requests and/or Change Orders. Therefore, the person or entity assigned to resolve any Issue, Change Request and/or Change Order may, according to the present invention, define and integrate into the project hierarchy 200 other Issues, Tasks, Change Requests and/or Change Orders upon which the resolution and completion the resolution and completion of their assigned Issue, Change Request and/or Change Order depends. This ability to define and integrate additional (and a priori unforeseen) Tasks, Issues, Change requests and/or Change Orders into the multi-level hierarchical structure 200 provides great functionality and flexibility. Indeed, the hierarchy 200 may be expanded as needed at any time during the project execution to a far more granular level than the initially defined hierarchy at the project inception.

Figure 4:
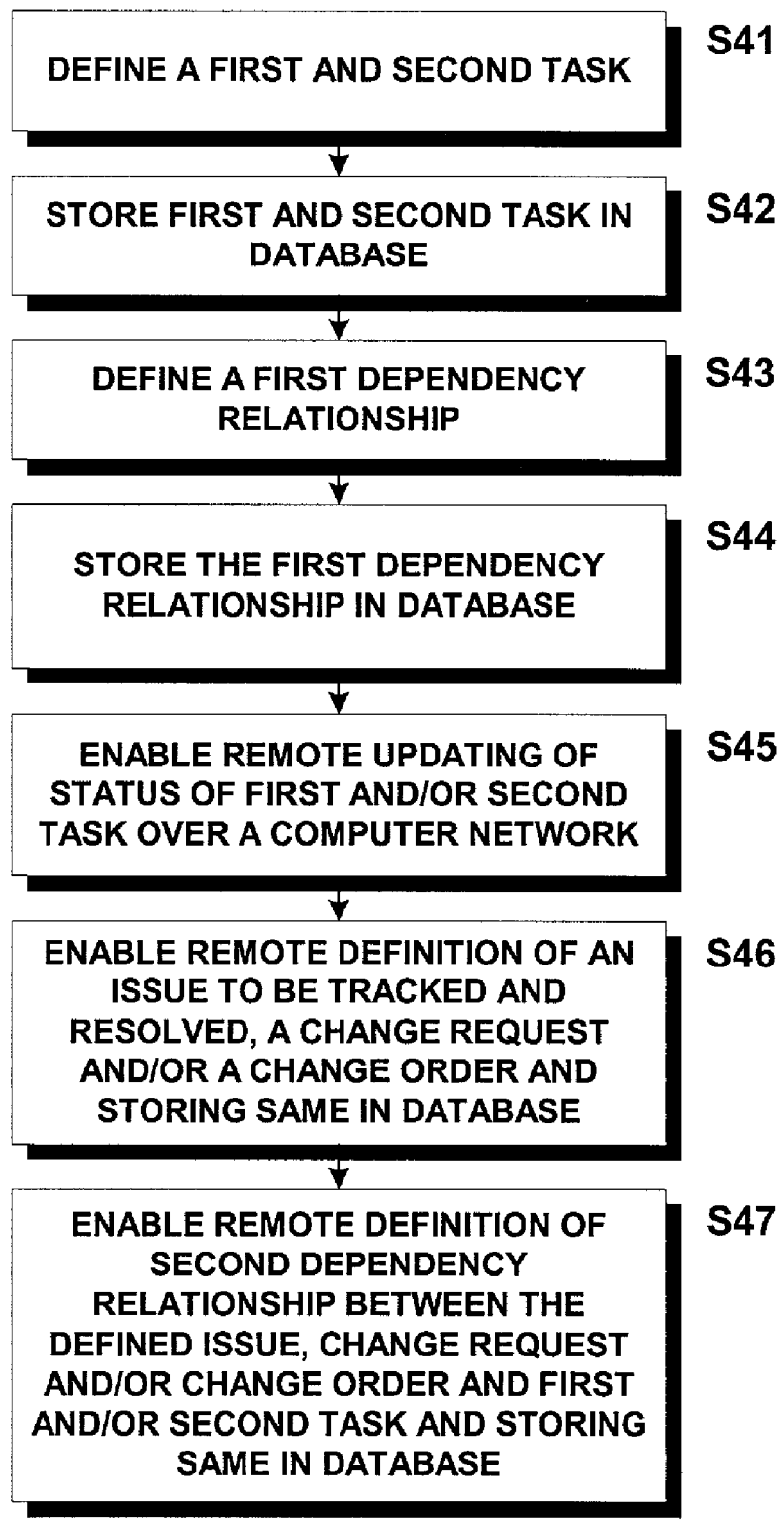
FIG. 4 is a flowchart of a method for managing complex projects, according to an aspect of the present invention.

For example, as shown in FIG. 4, $Task_{22}$ may have been originally defined and assigned to a person and/or organization in the initial project plan. Thereafter, as discussed above, it may be discovered that completion of $Task_{22}$ requires resolution of $Issue_{212}$, a heretofore-unknown problem or issue. $Issue_{212}$, therefore, may be defined, assigned to a person or organization and integrated into the hierarchy 200. In turn, those assigned to complete $Issue_{221}$, may define $Task_{221}$ as the or one of a plurality of Tasks whose completion 110 is necessary to resolve $Issue_{212}$. $Task_{221}$ may, therefore, also be integrated into the hierarchy 200. Upon tackling the resolution of $Task_{221}$, those responsible for $Task_{22}$, may discover, define, integrate and assign other Tasks and/or Issues, such as suggested by $Task_{2211}$, $Issue_{2212}$ and $Issue_{2213}$. Therefore, the resolution and completion of $Task_{2211}$, $Issue_{2212}$ and $Issue_{2213}$ may be selectively visible and tracked by those who have responsibility for hierarchically higher issues and tasks, as well by project managers having the ultimate responsibility for the project or portions thereof. In turn, during execution of $Task_{2211}$, a new Issue may be identified and integrated, as shown at $Issue_{22112}$. As shown, all of the aforementioned hierarchically lower Tasks and/or Issues (and any corresponding change Requests or Change orders) must be completed and/or resolved for the $Task_{22}$ to be completed. It is quite likely, moreover, that most (if not all) of these hierarchically lower Issues and/or Tasks were unknown (or not clearly defined or definable) at the time the initial project plan was developed. The present invention, therefore, dynamically supports any level of Tasks, Issues, Change Requests and Change Orders. That is, the hierarchical structure 200 according to the present invention may be caused to dynamically expand as needed, contemporaneously with the identification of previously unknown Tasks and/or Issues.

Each of the newly defined and integrated Tasks, Issues, Change Requests and/or Change Orders may be assigned to a specific person or entity who may be given primary responsibility for the resolution and completion of the newly defined and integrated Task, Issue, Change Request and/or Change Order. The present invention may also advantageously be configured to send a message (such as by email, for example) to the person assigned to any given Task, Issue, Change Request and/or Change Order. The message may be automatically sent via a workflow and Web-based system before the due date of the Task, Issue, Change Request and/or Change Order to remind and/or prompt for changes in the status and estimated completion dates thereof. Automated email-based messaging is highly useful when the resolution of one or more Tasks, Issues, Change requests and/or Change Orders depends upon actions of people or organizations that are widely scattered across multiple organizations, countries and/or time zones.

Figure 3:
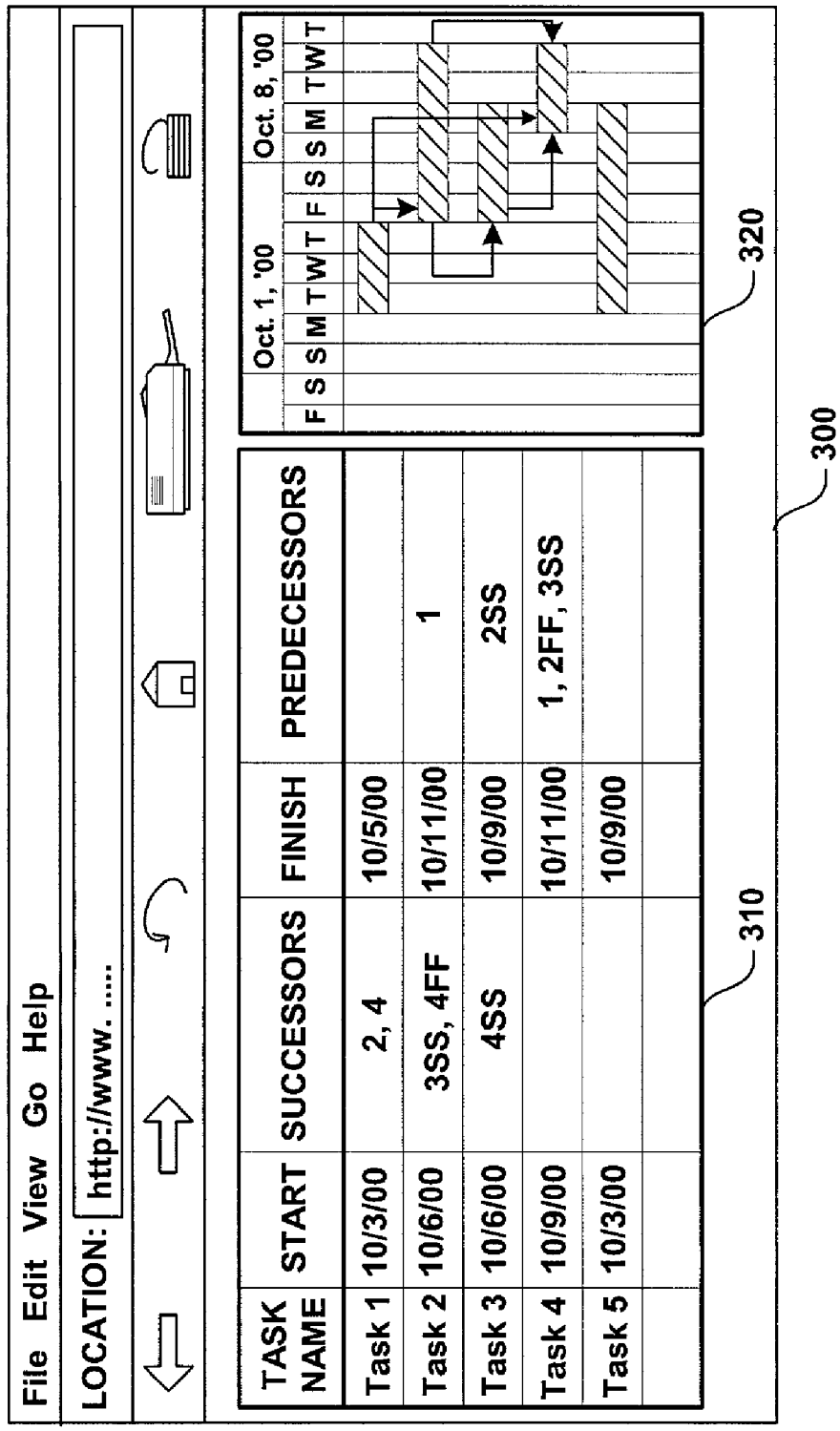
FIG. 3 shows an example of a Web browser displaying illustrative aspects of the present invention.

FIG. 3 shows an example of a Web browser displaying illustrative aspects of the present invention. According to the present invention, the present method of managing a complex project may advantageously be implemented, rendered on and operated using a standard Web browser 300, such as available from Microsoft or Netscape corporations, for example. As shown, the browser 300 may display, in its active window, a number of tasks, Issues, Change Requests and/or Change Orders in tabular form, as shown at 310. Such tabular representation is but one possible graphical representation for visualizing the constituent tasks, Issues, Change Requests and Change Orders of the project. Another representation is the Gantt chart, an exemplar of which is also shown at reference numeral 320 in the active window of the browser 300. Both the tabular representation 310 and the Gantt 320 chart convey similar information, albeit in different forms. Indeed, each task (any of the generically illustrated tasks in FIG. 3 may include an Issue, a Change Order or a Change Request according to the present invention) is uniquely identified by a task name, a start date, an identification of successor task(s) (if any), the type of dependency relationship (SS, SF, FS, FF, for example) between the task and its successor task(s), the task's finish date, an identification of the task's predecessor task(s) (if any) and the type of dependency relationship (SS, SF, FS, FF, for example) between the task and its predecessor task(s).

The present invention takes advantage of the growing ubiquity of the Internet and Web browsers to provide a method that enables a decentralized and collaborative management and maintenance of project schedules. Indeed, large projects may involve more than one organization and may be widely distributed over across time zones, geographical and enterprise boundaries. Using a combination of a database that is remotely accessible over a computer network and Web browsers enables the present invention to implement a server and thin client relationship between the database and the users thereof accessing the database to update the status of tasks and/or to define new Issues, Change Requests and/or Change Orders.

Figure 1:
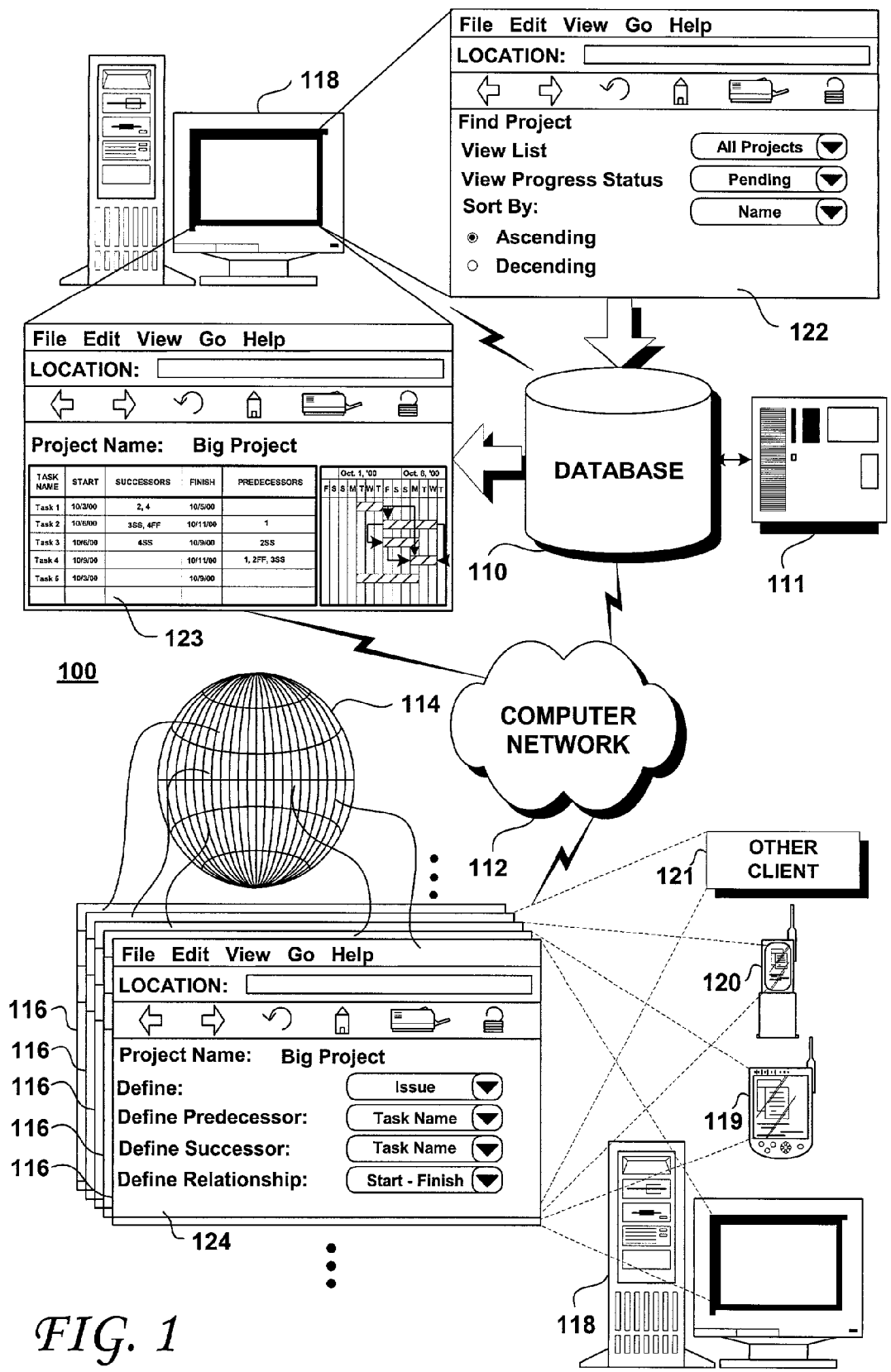
FIG. 1 illustrates aspects of a system and method for managing a complex project, according to an embodiment of the present invention.

FIG. 1 shows a representation of the method and system 100 for managing complex projects that include a plurality of interdependent tasks, according to an embodiment of the present invention. As shown therein, the system 100 includes a computer network 112, a database 110 that is remotely accessible via a server 111 coupled to the network 112 and one or more computers 118, personal Digital Assistants (PDAs) 119, Web-enabled mobile telephones 120 and/or other so-called thin clients 121 capable of accessing the network 112 and of running some version of a Web browser software 116 or some other suitable interface. According to the present invention, all of the participants in the project are loosely coupled to the database 110 through the computer network 112. The computer network 112 may include the Internet, for example, and/or other communication infrastructure. Indeed, the terms Internet and computer network are used interchangeably herein, and are intended to cover the Internet as it exists as of the time of this writing, and also any other communication infrastructure (public or private) for computers and/or other network devices yet to be developed. Security may be assured by suitable encryption of all communications and/or by creating secure Virtual Private Networks (for example) or by other means known to those of skill in this art, such as a Secure Socket layer (SSL). As shown in FIG. 1, each participant in the project throughout the world 114 may update the status of existing tasks of the project, input new tasks within the hierarchical tree structure and/or input new Issues, Change Orders and/or Change Requests through an Internet project management application embodying the present invention, via an Internet browser software 116 or via another suitable interface. Therefore, with the aid of a personal computer 118, network computer, Internet-enabled personal digital assistant 119, Web enabled mobile telephone 120 or any other device any device 121 equipped with a modem or other network access device allowing remote access to the corporate network or other Internet-enabled appliance, all participants in the project (and any other properly authorized personnel) may asynchronously input and collaboratively update the status of tasks, Issues, Change Requests and/or Change Orders (and the dependencies therebetween) into the project hierarchy by using a suitable browser and pointing the browser to a selected and preferably secure site (a World Wide Web site, for example) established for that purpose. Upon being properly authenticated (through inputting a username— password combination or other biometrical identification, for example), the project participant may be prompted or given the opportunity to enter and/or to update the above-listed information, as shown at 124.

According to the present invention, the database 110 may store the tasks, Issues, Change Requests and Change Orders for a single project or for multiple projects. The user may retrieve a specific project by entering the necessary information in a project search screen, a simplified example of which is shown at 122 in FIG. 1. Thereafter, the database 110 may be searched and user selectable views of the desired project may be displayed on the user's browser, as shown at 123.

FIG. 4 is a flowchart of a method for managing project that includes a plurality of interdependent tasks, according to an aspect of the present invention. As shown, the method includes a first step S41 in which (at least) a first and second task of the plurality of tasks are defined. Step S42 calls for storing the first and second tasks in a database (such as shown at 110 in FIG. 1) stored in a server (such as shown at 111 in FIG. 1) that is selectively, securely and remotely accessible over a computer network (such as shown at 112 in FIG. 1). Each of the first and second tasks has a status (such as, for example, "Not Started", "On track", "Complete", "In trouble", "At Risk", "On Hold" or "Cancelled") associated therewith. As shown in step S34, a first dependency relationship (such as, for example, SS, SF, FS or FF) is defined between the first and the second tasks (and between any of the other defined tasks). This defined first dependency relationship may then be stored in the database 110, as called for by step S44. The application embodying the present invention may then enable the remote updating of the status of the first and/or second tasks over the computer network 112 in the manner detailed above, as shown at S45. Not only may project participants remotely update the status of the first and second tasks over the computer network (assuming proper authentication of the user and assuming that the user has permission to access and/or update the status the first or second tasks), but the database 110 and the server 111 may be configured to enable the user to also access the database 110 and to remotely define an Issue, a Change Request and/or a Change Order, as shown at S46. The defined Issue, Change Request and/or Change Order may then be stored in the database 110. According to the present invention, an Issue identifies a problem within the project whose resolution is to be tracked, the Change Request identifies one or more steps to be taken pending authorization to resolve Issue and the Change Order identifies authorized steps to resolve the Issue. The problem identified by the Issue, according to the present invention, may be thought of as a problem that was previously unidentified at the time when the first and second tasks were defined. As called for by step S47, the database 110 and/or the server 111 then may enable the remote definition of one or more second dependency relationships between the defined Issue, Change Request or Change Order and the first and/or second tasks. The defined second dependency relationship(s) may then be stored in the database 110.

According to the present invention, permissions may be defined that delineate access rights for the first task, the second task, the Issue, the Change Request and/or the Change Order. In this manner, security may be maintained at all levels of the project and only those having the proper permission are allowed access to selected tasks. For example, if a portion of the project is outsourced to an outside vendor, the vendor may be given permission (and required) to access the project hierarchy, but only to those tasks, Issues, Change Requests and/or Change Orders that pertain to the outsourced portion of the project for which the vendor has responsibility (for example). To insure that the vendor maintains current the status of the tasks, Issues, Change Requests and/or Change Orders that pertain to the outsourced portion of the project for which the vendor has responsibility, the vendor may be required (by contract, for example) to make regular updates to the status of these items by accessing the database 110 over the network 112. The permissions assigned may further define rights to remotely change the status of the first task and/or the second task and/or to remotely change the first dependency relationship between the first and/or second task. The permissions assigned to project groups and/or individual project participants may be crafted in most any manner consistent with the security requirements of the project, as those of skill in this art may recognize.

A lag time may be incorporated in the first and/or second dependency relationships, the lag time defining a lag time between the start and/or finish of at least two of the defined tasks, the Issue, the Change Request and the Change Order. For example, the dependency relationship between a first task and a second task may be defined in such a manner as to specify that the second task must be finished within 2 days of the second task finishing. The lag quantity "2 days", therefore, would be stored in the database 110 along with the defined dependency relationship (e.g., SS, SF, FS, FF, for example) between the first and second tasks.

As shown in FIGS. 1 and 3, the Web-enabled application embodying the present invention may maintain a selectively and remotely accessible graphical representation (rendered on browser software, for example) of at least the first task, the second task, the first dependency relationship(s), the defined Issue(s), Change Request(s), the Change Order(s) and/or the second dependency relationship(s). Such graphical representation is preferably selectively truncated, masked or otherwise customized, depending upon the permission of the person requesting access thereto. To insure that the defined tasks, Issues, Change Requests and Change Orders are accurately tracked and executed in a timely fashion, an identity of one or more entities (project team, a project member, a subcontractor and a vendor, for example) allowed access to and/or having responsibility for each of the defined first and second tasks, the defined Issue, Change Request or the Change Order is preferably specified and stored in the database 110. Additionally, one or more documents may be associated with and stored along the defined first and second tasks, the Issue, the Change Request and the Change Order. Such documents may further define and detail the task, Issue, Change Request and/or Change Order to which the document is associated. For example, the document may be a detailed design specification of a task, service, subcomponent and/or assembly to be produced by the task, Issue, Change Request and/or Change Order.

Figure 5:
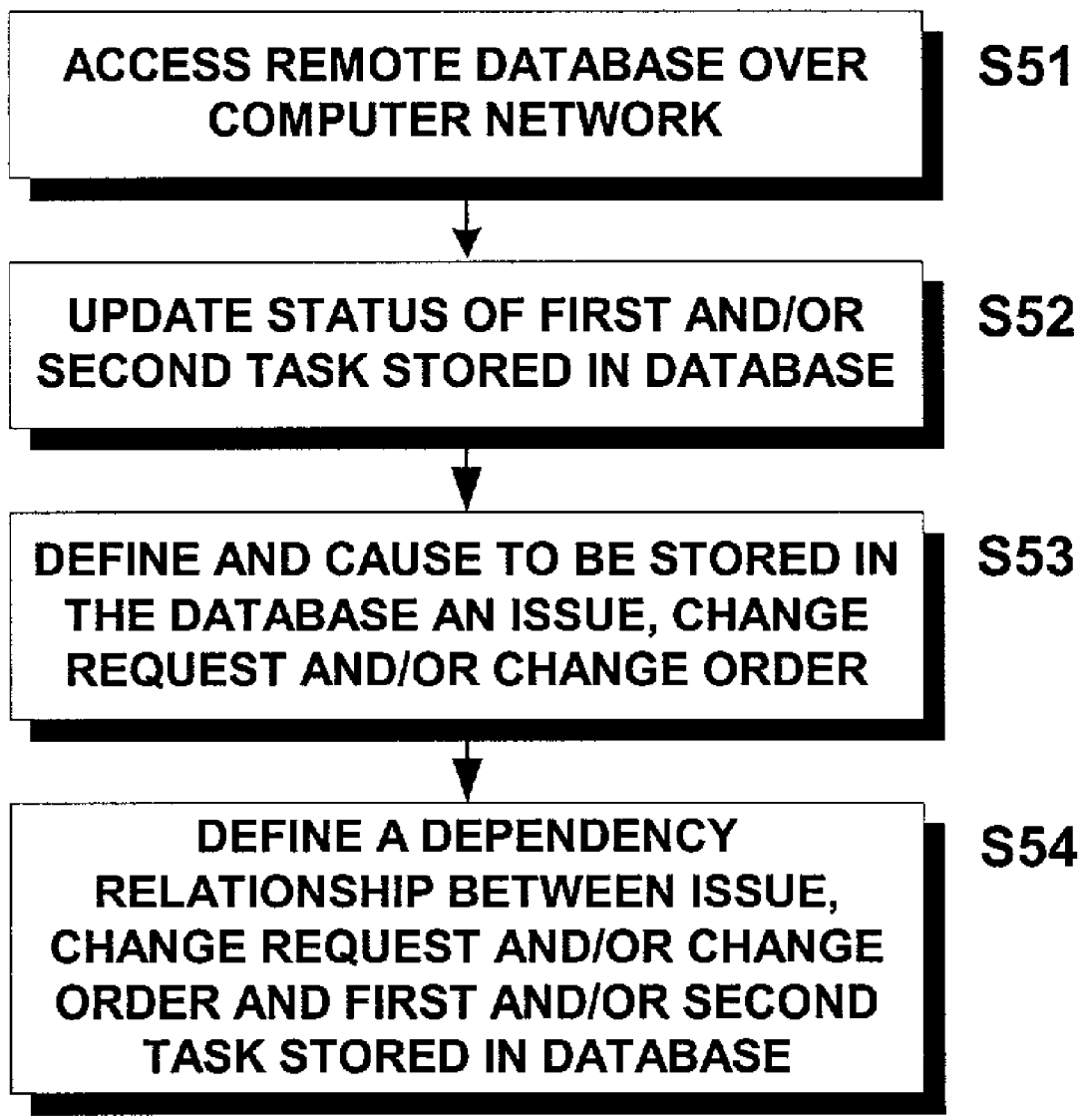
FIG. 5 is a flowchart of a method for managing complex projects, according to another aspect of the present invention.

FIG. 5 is a flowchart of a method for managing complex projects, according to another aspect of the present invention. Specifically, the steps of the method detailed in FIG. 5 are those that may be taken by a person accessing the database 110 across the network 112 for the purpose of updating the status of or inputting a new task or tasks, Issue(s), Change Request(s) and/or Change Order(s). As shown in step S51, the database 110 may be accessed over the computer network 112, such as the Internet. As shown in Step S52, after proper authentication, the user accessing the database 110 may update the status of any task or selected tasks within the project, depending upon his or her assigned permission. As shown in step S53, the user, upon updating the status of a task, be given the opportunity to define an Issue or Issues, Change Request(s) and/or Change Order(s) and cause same to be stored in the database 110. Alternatively, the user may define such Issue(s), Change Request(s) and/or Change Order independently of any contemporaneous update of the status of any task, Issue, Change Request and/or Change Order. The user may then, as shown at S54, define a dependency between the new Issue, Change Request and/or Change Order and any other previously defined task, Issue, Change Request and/or Change Order.

Hardware Description

Figure 6:
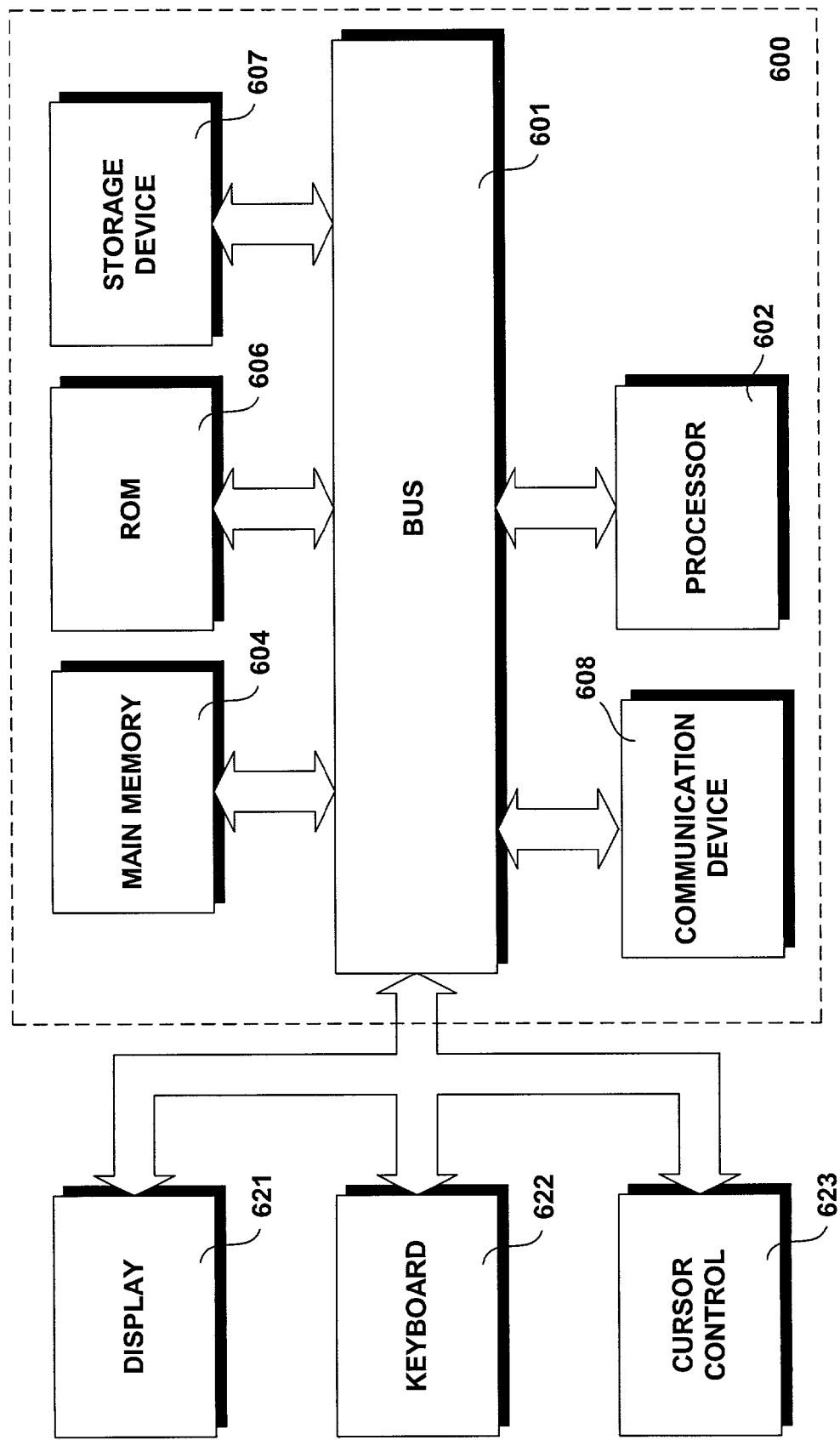
FIG. 6 is a diagram of a computing device with which the present invention may be practiced.

FIG. 6 illustrates a block diagram of a computing device 600 with which an embodiment of the present invention may be implemented. Examples of such computing devices are shown at reference numeral 118 in FIG. 1. Computing device 600 includes a bus 601 or other communication mechanism for communicating information, and a processor 602 coupled with bus 601 for processing information. Computing device 600 further comprises a random access memory (RAM) or other dynamic storage device 604 (referred to as main memory), coupled to bus 601 for storing information and instructions to be executed by processor 602. Main memory 604 also may be used for storing temporary variables or other intermediate information during execution of instructions by processor 602. Computing device 600 may also include a read only memory (ROM) and/or other static storage device 606 coupled to bus 601 for storing static information and instructions for processor 602. A data storage device 607, such as a magnetic disk or optical disk, may be coupled to bus 601 for storing information and instructions. A communication device 608, such as a modem or network (such as Ethernet, for example) card is also coupled to the bus 601 to provide access to a network, such as shown at 112 in FIG. 1.

The computing device 600 may also be coupled via bus 601 to a display device 621, such as a cathode ray tube (CRT), for displaying information to a computer user. An alphanumeric input device 622, including alphanumeric and other keys, is typically coupled to bus 601 for communicating information and command selections to processor 602. Another type of user input device may be the user's own voice or cursor control 623, such as a mouse, a trackball, or cursor direction keys for communicating direction information and command selections to processor 602 and for controlling cursor movement on display 621.

The present invention is related to the use of computing device 600 to manage complex projects. According to one embodiment, the processing may be carried out by one or more computing devices 600 in response to processor(s) 602 executing sequences of instructions contained in memory 604. Such instructions may be read into memory 604 from another computer-readable medium, such as data storage device 607 and/or from a remotely located server. Execution of the sequences of instructions contained in memory 604 causes processor(s) 602 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer implemented method of managing a project that includes a plurality of interdependent tasks organized in a hierarchy, comprising the steps of:

defining the plurality of tasks and storing the defined plurality of tasks in a database stored in a server that is selectively and remotely accessible over a computer network, each of the plurality of tasks having a status associated therewith;

defining a first dependency relationship between each of the defined plurality of tasks to define the hierarchy of tasks and storing the defined first dependencies in the database;

enabling remote retrieval of the status from the database over the computer network and remote updating of the status of any of the plurality of tasks over the computer network;

enabling remote definition of an Issue, a Change Request and a Change Order, the Issue identifying a problem within an identified one of the defined plurality of tasks whose resolution is to be tracked and whose resolution is necessary for the identified task to be completed, the Change Request identifying at least one step to be taken pending authorization to resolve the Issue and the Change Order identifying authorized steps to resolve the Issue, wherein the identified at least one step to be taken to resolve the Issue is included in the Change Order when the Change Request is authorized;

storing the defined Issue, Change Request and Change Order in the database;

requiring remote definition and storage in the database of at least one second dependency relationship between the defined Issue, Change Request and Change Order and the identified task in such a manner that the defined Issue, Change Request and Change Order is integrated into the hierarchy of tasks without changing the defined first dependencies;

associating a document with at least one of the Issue, the Change Request and the Change Order, the document including proposed or authorized steps to resolve the Issue, and storing the associated document in the database, and providing a selectively and remotely accessible graphical representation of the hierarchy, including the plurality of tasks or selected ones of the plurality of tasks; the first dependency relationship; the defined Issue, Change Request or the Change Order, the associated document and the at least one second dependency relationship.

2. The method of claim 1, further including defining a permission that defines access rights for the defined plurality of tasks, the Issue, the Change Request and the Change Order.

3. The method of claim 2, wherein the permission further defines a right to at least one of:
remotely change the status of at least one of the plurality of tasks, and
remotely change the first dependency relationship between selected ones of the defined plurality of tasks.

4. The method of claim 1, wherein at least one of the first and second dependency relationships are selected from a group including Start-Start, Start-Finish, Finish-Start and Finish-Finish.

5. The method of claim 4, wherein at least one of the first and second dependency relationships defines a lag time between the start and/or finish of at least two of the defined plurality of tasks, the Issue, the Change Request and the Change Order, depending upon the selected dependency relationship.

6. The method of claim 1, wherein the problem identified by the Issue is a problem that was previously unidentified at the time when the plurality of tasks were defined.

7. The method of claim 1, wherein each of the defined Issue, Change Order and Change Request includes a status associated therewith and wherein the method further includes a step of enabling remote updating of the status of the defined Issue, Change Request and Change Order.

8. The method of claim 7, wherein the status of the plurality of tasks, the defined Issue, Change Order and Change Request is selected from a group including not started, on track, complete, in trouble, on hold and cancelled.

9. The method of claim 2, wherein the permission further defines a right to remotely change the at least one stored second dependency relationship.

10. The method of claim 1, wherein the selectively and remotely accessible graphical of the hierarchy representation is rendered on a Web browser.

11. The method of claim 1, further comprising a step of defining and storing in the database an identity of at least one entity allowed access to and/or having responsibility for each of the defined plurality of tasks, the defined Issue, Change Request and Change Order.

12. The method of claim 11, wherein the entity is selected from a group including a project team, a project member, a subcontractor and a vendor.

13. The method of claim 1, wherein the computer network crosses enterprise boundaries.

14. The method of claim 1, wherein the graphical representation of the hierarchy includes a selectively expandable hierarchical tree that shows the plurality of tasks or selected ones of the plurality of tasks, the first dependency relationship, the defined Issue, Change Request and the Change Order, and the at least one second dependency relationship.

15. The method of claim 1, further comprising the step of prompting for the remote definition of the Issue, Change Request, Change Order and the at least one second dependency relationship when the status of at least one of the plurality of tasks is updated.

16. A computer-implemented method of participating in a project that includes a plurality of interdependent tasks organized in a hierarchy, comprising the steps of:

accessing a remote database over a computer network, the database storing:
a definition of the plurality of tasks,
a status associated with each of the defined tasks, and
a first dependency relationship between each of the defined plurality of tasks;
updating of the status of at least one of the plurality of tasks over the computer network;
defining and causing to be stored in the database an Issue, a Change Request and a Change Order, the Issue identifying a problem within an identified one of the plurality of tasks whose resolution is to be tracked and whose resolution is necessary for the identified task to be completed, the Change Request identifying at least one step to be taken pending authorization to resolve Issue and the Change Order identifying authorized steps to resolve the Issue, wherein the identified at least one step to be taken to resolve the Issue is included in the Change Order when the Change Request is authorized;
associating a document with at least one of the Issue, the Change Request and the Change Order, the document including proposed or authorized steps to resolve the Issue, and storing the associated document in the database, and
defining and storing in the database at least one second dependency relationship between the defined Issue, Change Request and Change Order and the identified task in such a manner that the defined Issue, Change Request and Change Order is integrated into the hierarchy of tasks without changing the defined first dependencies.

17. The method of claim 16, wherein a permission is assigned that defines access rights for each of the plurality of tasks, the first dependency relationship, the Issue, the Change Request, the Change Order and the second dependency relationship.

18. The method of claim 17, wherein the accessing step selectively accesses selected ones of the stored plurality of tasks, the status associated with each of the plurality of tasks, and the first dependency relationship between the plurality of tasks depending upon the assigned permission.

19. The method of claim 17, wherein the permission further defines a right to at least one of:
changing the status of at least one of the plurality of tasks, and
changing the first dependency relationship between selected ones of the plurality of tasks.

20. The method of claim 16, wherein at least one of the first and second dependency relationships are selected from a group including Start-Start, Start-Finish, Finish-Start and Finish-Finish.

21. The method of claim 20, wherein at least one of the first and second dependency relationships defines a lag time between the start and/or finish of at least two of the defined plurality of tasks, the Issue, the Change Request and the Change Order, depending upon the selected dependency relationship.

22. The method of claim 16, wherein the problem identified by the Issue is a problem that was previously unidentified at the time when the plurality of tasks were defined.

23. The method of claim 16, wherein each of the defined Issue, Change Order and Change Request includes a status associated therewith and wherein the method further includes a step of updating the status of the defined Issue, Change Request and Change Order.

24. The method of claim 23, wherein the status of each of the plurality of tasks, the defined Issue, Change Order and Change Request is selected from a group including not started, on track, complete, in trouble, on hold and cancelled.

25. The method of claim 17, wherein the permission further defines a right to change the at least one stored second dependency relationship.

26. The method of claim 16, further comprising the step of viewing a graphical representation of hierarchy, including the plurality of tasks or selected ones of the plurality of tasks, the first dependency relationship, the defined Issue, Change Request and the Change Order, and the at least one second dependency relationship on a Web browser.

27. The method of claim 16, further comprising the step of inputting a definition of the Issue, Change Request, Change Order and the at least one second dependency relationship upon updating the status of at least one of the plurality of tasks.

28. The method of claim 16, further comprising a step of defining and causing to be stored in the database an identity of at least one entity allowed access to and/or having responsibility for each of the defined plurality of tasks, the defined Issue, Change Request and the Change Order.

29. The method of claim 28, wherein the entity is selected from a group including a project team, a project member, a subcontractor and a vendor.

30. The method of claim 16, wherein the computer network crosses enterprise boundaries.

31. The method of claim 26, wherein the graphical representation of the hierarchy includes a selectively expandable hierarchical tree that shows the plurality of tasks or selected ones of the plurality of tasks, the first dependency relationship, the defined Issue, Change Request and the Change Order, and the second dependency relationship.

32. A computer system configured for managing a project timeline that includes a plurality of interdependent tasks organized in a hierarchy, comprising:
at least one processor;
at least one data storage device;
a plurality of processes spawned by said at least one processor, the processes including processing logic for:
defining the plurality of tasks and storing the defined plurality of tasks in a database stored in a server that is selectively and remotely accessible over a computer network, each of the plurality of tasks having a status associated therewith;
defining a first dependency relationship between each of the defined plurality of tasks to define the hierarchy of tasks and storing the defined first dependencies in the database;
enabling remote retrieval of the status from the database over the computer network and remote updating of the status of any of the plurality of tasks over the computer network;
enabling remote definition of an Issue, a Change Request and a Change Order, the Issue identifying a problem within an identified one of the defined plurality of tasks whose resolution is to be tracked and whose resolution is necessary for the identified task to be completed, the Change Request identifying at least one step to be taken pending authorization to resolve the Issue and the Change Order identifying authorized steps to resolve the Issue, wherein the identified at least one step to be taken to resolve the Issue is included in the Change Order when the Change Request is authorized;
storing the defined Issue, Change Request and Change Order in the database;
requiring remote definition and storage in the database of at least one second dependency relationship between the defined Issue, Change Request and Change Order and the identified task in such a manner that the defined Issue, Change Request and Change Order is integrated into the hierarchy of tasks without changing the defined first dependencies;
associating a document with at least one of the Issue, the Change Request and the Change Order, the document including proposed or authorized steps to resolve the Issue, and storing the associated document in the database, and
providing a selectively and remotely accessible graphical representation of the hierarchy, including the plurality of tasks or selected ones of the plurality of tasks; the first dependency relationship; the defined Issue, Change Request or the Change Order, the associated document and the at least one second dependency relationship.

33. The system of claim 32, further including processing logic for defining a permission that defines access rights for at least one of the first task, the second task, the Issue, the Change Request and the Change Order.

34. The system of claim 33, wherein the permission further defines a right to at least one of:
remotely change the status of at least one of the plurality of tasks, and
remotely change the first dependency relationship between selected ones of the defined plurality of tasks.

35. The system of claim 32, wherein at least one of the first and second dependency relationships are selected from a group including Start-Start, Start-Finish, Finish-Start and Finish-Finish.

36. The system of claim 35, wherein at least one of the first and second dependency relationships defines a lag time between the start and/or finish of at least two of the defined plurality of tasks, the Issue, the Change Request and the Change Order, depending upon the selected dependency relationship.

37. The system of claim 32, wherein the problem identified by the Issue is a problem that was previously unidentified at the time when the plurality of tasks were defined.

38. The system of claim 32, wherein each of the defined Issue, Change Order and Change Request includes a status associated therewith and wherein the method further includes a step of enabling remote updating of the status of the defined Issue, Change Request and Change Order.

39. The system of claim 38, wherein the status of the plurality of tasks, the defined Issue, Change Order and Change Request is selected from a group including not started, on track, complete, in trouble, on hold and cancelled.

40. The system of claim 33, wherein the permission further defines a right to remotely change the at least one stored second dependency relationship.

41. The system of claim 32, wherein the selectively and remotely accessible graphical representation of the hierarchy is rendered on a Web browser.

42. The system of claim 32, further comprising processing logic to carry out a step of defining and storing in the database an identity of at least one entity allowed access to and/or having responsibility for each of the defined plurality of tasks, the defined Issue, Change Request and the Change Order.

43. The system of claim 42, wherein the entity is selected from a group including a project team, a project member, a subcontractor and a vendor.

44. The system of claim 32, wherein the computer network crosses enterprise boundaries.

45. The system of claim 32, wherein the graphical representation of the hierarchy includes a selectively expandable hierarchical tree that shows the plurality of tasks or selected ones of the plurality of tasks, the first dependency relationship, the defined Issue, Change Request and the Change Order, and the at least one second dependency relationship.

46. The system of claim 32, further comprising processing logic to carry out the step of prompting for the remote definition of the Issue, Change Request, Change Order and the at least one second dependency relationship when the status of one of the plurality of tasks is updated.

47. A machine-readable medium having data stored thereon representing sequences of instructions which, when executed by computing device, causes said computing device to manage a project timeline that includes a plurality of interdependent tasks organized in a hierarchy by performing the steps of:
 defining the plurality of tasks and storing the defined plurality of tasks in a database stored in a server that is selectively and remotely accessible over a computer network, each of the plurality of tasks having a status associated therewith;
 defining a first dependency relationship between each of the defined plurality of tasks to define the hierarchy of tasks and storing the defined first dependencies in the database;
 enabling remote retrieval of the status from the database over the computer network and remote updating of the status of any of the plurality of tasks over the computer network;
 enabling remote definition of an Issue, a Change Request and a Change Order, the Issue identifying a problem within an identified one of the defined plurality of tasks whose resolution is to be tracked and whose resolution is necessary for the identified task to be completed, the Change Request identifying at least one step to be taken pending authorization to resolve the Issue and the Change Order identifying authorized steps to resolve the Issue, wherein the identified at least one step to be taken to resolve the Issue is included in the Change Order when the Change Request is authorized;
 storing the defined Issue, Change Request and Change Order in the database;
 requiring remote definition and storage in the database of at least one second dependency relationship between the defined Issue, Change Request and Change Order and the identified task in such a manner that the defined Issue, Change Request and Change Order is integrated into the hierarchy of tasks without changing the defined first dependencies;
 associating a document with at least one of the Issue, the Change Request and the Change Order, the document including proposed or authorized steps to resolve the Issue, and storing the associated document in the database, and
 providing a selectively and remotely accessible graphical representation of the hierarchy, including the plurality of tasks or selected ones of the plurality of tasks; the first dependency relationship; the defined Issue, Change Request or the Change Order, the associated document and the at least one second dependency relationship.

48. The medium of claim 47, further including defining a permission that defines access rights for the defined plurality of tasks, the Issue, the Change Request and the Change Order.

49. The medium of claim 48, wherein the permission further defines a right to at least one of:
 remotely change the status of at least one of the plurality of tasks, and
 remotely change the first dependency relationship between selected ones of the defined plurality of tasks.

50. The medium of claim 47, wherein at least one of the first and second dependency relationships are selected from a group including Start-Start, Start-Finish, Finish-Start and Finish-Finish.

51. The medium of claim 50, wherein at least one of the first and second dependency relationships defines a lag time between the start and/or finish of at least two of the defined plurality of tasks, the Issue, the Change Request and the Change Order, depending upon the selected dependency relationship.

52. The medium of claim 47, wherein the problem identified by the Issue is a problem that was previously unidentified at the time when the plurality of tasks were defined.

53. The medium of claim 47, wherein each of the defined Issue, Change Order and Change Request includes a status associated therewith and wherein the method further includes a step of enabling remote updating of the status of the defined Issue, Change Request and Change Order.

54. The medium of claim 53, wherein the status of the plurality of tasks, the defined Issue, Change Order and Change Request is selected from a group including not started, on track, complete, in trouble, on hold and cancelled.

55. The medium of claim 48, wherein the permission further defines a right to remotely change the at least one stored second dependency relationship.

56. The medium of claim 47, wherein the selectively and remotely accessible graphical representation of the hierarchy is rendered on a Web browser.

57. The medium of claim 47, further comprising a step of defining and storing in the database an identity of at least one entity allowed access to and/or having responsibility for each of the defined plurality of tasks, the defined Issue, Change Request or the Change Order.

58. The medium of claim 57, wherein the entity is selected from a group including a project team, a project member, a subcontractor and a vendor.

59. The medium of claim 47, wherein the computer network crosses enterprise boundaries.

60. The medium of claim 47, wherein the graphical representation of the hierarchy includes a selectively expandable hierarchical tree that shows the plurality of tasks or selected ones of the plurality of tasks, the first dependency relationship, at least one of the defined Issue, Change Request and the Change Order, and the at least one second dependency relationship.

61. The medium of claim 47, further comprising the step of prompting for the remote definition of the Issue, Change Request, Change Order and the at least one second dependency relationship when the status of at least one of the plurality of tasks is updated.

* * * * *